United States Patent [19]
Bureau

[11] Patent Number: 5,551,558
[45] Date of Patent: Sep. 3, 1996

[54] COMBINED PORTABLE CONTAINER AND COLLAPSIBLE TABLE

[76] Inventor: H. Lee Bureau, 3 Park Ave., Waterville, Me. 04901

[21] Appl. No.: 327,091

[22] Filed: Oct. 20, 1994

Related U.S. Application Data

[63] Continuation-in-part of Ser. No. 26,782, Jul. 1, 1994.
[51] Int. Cl.$^6$ .................................................. B65D 43/00
[52] U.S. Cl. ........................... 206/223; 312/258; 190/11; 220/23.86
[58] Field of Search ................................ 312/241, 140.2, 312/258; 190/11; 62/258, 457.7; 206/216, 223; 220/23.83, 23.86

[56] References Cited

U.S. PATENT DOCUMENTS 2,526,767  10/1950  Parker .................................. 206/216 X
3,454,189   7/1969  Lauterbach .............................. 206/216

Primary Examiner—Jacob K. Ackun
Attorney, Agent, or Firm—Pearson & Pearson

[57] ABSTRACT

A portable container of the type generally used for retaining within a receptacle storage area items and thermal units, such as a refrigeration unit or ice packs, so as to maintain such items at a differential temperature relative to ambient temperature. The container includes U-shaped members positionable in a first position extending above and across the receptacle to define handle elements for carrying the receptacle and in a second position extending below the receptacle to define leg elements for supporting the receptacle thereabove. The invention further includes a mechanism for locking the U-shaped members in the second position. A cover overlying the storage area has extensions which pivot between an compact condition overlying the cover and a deployed condition where the extensions with the upper surface of a central portion of the cover define a table surface. Containers according to this invention may further include a wheel rotationally engaging a supporting surface and handles for pushing or pulling the container supported in part on the wheel to facilitate the transport of the container.

30 Claims, 7 Drawing Sheets

COMBINED PORTABLE CONTAINER AND COLLAPSIBLE TABLE

CROSS REFERENCE TO RELATED APPLICATION

This is a continuation-in-part of my copending application Ser. No. 29/026,782, filed Jul. 1, 1994 for an IMPROVED COMBINED COOLER AND COLLAPSIBLE TABLE.

BACKGROUND OF THE INVENTION

1. Field of the Invention

This invention relates to storage containers and more particularly to improved portable containers that are easier to transport and more functional than prior art containers.

2. Description of Related Art

Picnic coolers are an example of the type of portable containers to which this invention relates. People typically use such portable containers to maintain items therein, such as food and beverages, at a cooler temperature relative to the ambient temperature outside the container. Generally, some element or device, like ice, freezer packs, or even a refrigeration unit, connects with the air in the container so as to improve the maintenance of the temperature differential. It will be understood that in some cases heaters, heat packs or the like maintain an elevated temperature in the container so as to maintain items therein at a higher temperature relative to the ambient temperature outside the container.

Such portable storage containers are frequently used by campers, picnickers and others to maintain food and beverages and other items at a differential temperature relative to the ambient temperature. These containers are preferably sized to be large enough to carry sufficient items (e.g., food and beverages) and thermal transfer media such as ice or freezer packs. Many such storage containers also include integral handles to facilitate transport of the container. However, the larger the storage area of the container the heavier the device becomes in a loaded condition. The weight of such containers when loaded and the overall size of such devices seriously limit the portability of even the containers having handles. Additionally, campers and picnickers frequently carry other equipment with them such as tables that further increases the burdens associated with transit of the container and other equipment.

U.S. Pat. No. 4,515,421 to Steffes (1985) discloses an insulating container and a planar member adapted to be supported in a variety of location and positions in, from, and on the cooler. Specifically, the planar member can be supported in the cooler vertically as a divider or horizontally as a shelf for supporting items above the bottom of the container. Additionally, the container can receive and support the planar member along an outer side to form a horizontal shelf extending from the container. Finally, the planar member is also suited for placement on the cover of the container to define a cutting board surface.

U.S. Pat. No. 4,581,902 to Starck et al. (1986) discloses an insulating container including an associated table that is retained adjacent a cover of the container in a first position. In a second deployed condition the table is supported over the cover by extending legs through the cover such that the container forms the support for the legs. Starck et al. further disclose a segmented table surface with leaves hingedly mounted to a central portion of the table to define an enlarged support surface of the table.

U.S. Pat. No. 3,347,060 to Barkan (1967) discloses an portable insulating box that comprises an open top container and cover. The box also includes a powered refrigeration unit carried with the container. The container includes inflatable tubes defining the upper portion of side walls of the container. Selective inflation and deflation of the tubes enables resizing of the container to accommodate various quantities and sizes of items to be placed within the container.

Portable storage containers or trunks not adapted for holding items at a different temperature relative to the ambient temperature are also known. U.S. Pat. No. 592,159 to Miller (1897), for example, discloses a storage trunk with a storage tray for supporting items within the trunk that mounts on the upper surface of the trunk to define a table surface. The tray includes hinged sides which move from a first position defining the tray to a second deployed condition to increase the area of the table formed by the tray.

U.S. Pat. No. 4,436,353 to Tucker (1984) discloses another example of a portable storage device and table. The device comprises a trunk including a base, an inner tray, and a cover. The cover includes hinged mounted panels. The top panel of the cover and the tray which is hinged secured to the base opposite the top panel of the cover form upwardly extending support members for a table surface. The table surface is formed by a second panel of the cover extending between the tray and the top panel when in their extending support member positions. Third and fourth panels hingedly secured to the second panel in a deployed condition define with the second panel an enlarged table surface.

Other devices which incorporate a cooling container and a table are also known. U.S. Pat. No. 2,093,856 to Wales (1937), for example, discloses a refrigerator that is supported from a table with an upper surface comprising a portion of the support surface of the table. Access to items in the refrigerator occurs by raising a portion of the refrigerator including the upper surface relative to the remainder of the table. Similarly, U.S. Pat. No. 2,895,311 to Spalvins (1959) discloses a table and refrigerator where an upper portion of the refrigerator forms a portion of the table. The refrigerator base in this instance, however, supports the table surface. Access to the refrigerator in Spalvins, like Wales, occurs by raising a common portion the table surface and refrigerator.

The foregoing references disclose a plurality of portable tables, refrigeration/insulating containers, and combined storage devices and tables. However, the references do not provide a portable container for containing items to maintained within a temperature range having combined support members that support the portable container in a suspended condition and support the container above the members in a raised condition with the upper surface of the container defining a table. The references do not disclose a portable container for containing items to be maintained within a temperature range having an expansible lid or cover that unfolds to define a table surface while maintaining items in the container in a closed compartment of the container. Finally, the references fail to provide a portable insulating container that is also easily transportable.

SUMMARY

Therefore it is an object of this invention to provide a portable container having support members for selective positioning as support legs and as support handles.

Another object of this invention is to provide a combination portable container for maintaining items within a temperature range and for serving as a raised table.

Still another object of this invention is to provide a portable container for maintaining items within a temperature range that is easily transported by users thereof.

Still another object of this invention is to provide a portable container form maintaining items within a temperature range that is both easily transported by users and serves as a raised table.

Yet still another object of this invention is to provide a portable container for maintaining items within a temperature range and for selective configuration as a raised table while providing relatively easy access to a storage portion of the container.

A further object of this invention to provide a portable container having support members for selective positioning as support legs and as support handles that is easily transported by users.

Still a further object of this invention to provide a portable container having support members for selective positioning as support legs and as support handles that is both easily transported by users and serves as a raised table.

In accordance with this invention a portable container for maintaining items within a temperature range includes a bottom and side portions that define a receptacle of given dimensions and further include leg means. The leg means comprise first and second bases secured proximate opposed edges of the bottom, a U-shaped member pivotally supported by each of the bases, and means interactive with each of the bases and associated U-shaped members for locking the U-shaped member in a first position. Each of the U-shaped members pivots to a first position with the U-shaped members depending from the bottom of the receptacle so as to define legs of the container and to a second position with a portion of the U-shaped members extending above the container to define a carrying handle.

In accordance with another aspect of this invention, a combination portable container for items to maintained within a temperature range and serving table includes a open-top receptacle for containing a medium that maintains the items in the required temperature range and for containing the items. A central portion for overlying the open top of said receptacle and extensions hinged thereon form, in an opened position, a planar table surface and thereby define the combination container and table.

According to a further aspect of this invention, a portable container for items to maintained within a temperature range comprises a receptacle having first and second spaced opposite sides. A first support attaches to the first side and supports wheel means for rotation during movement of the container. A second support attaches to the receptacle and supports handle means extensible beyond the second side for enabling an individual to grasp the container whereby the wheel means and handle means facilitate the transport of the receptacle.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
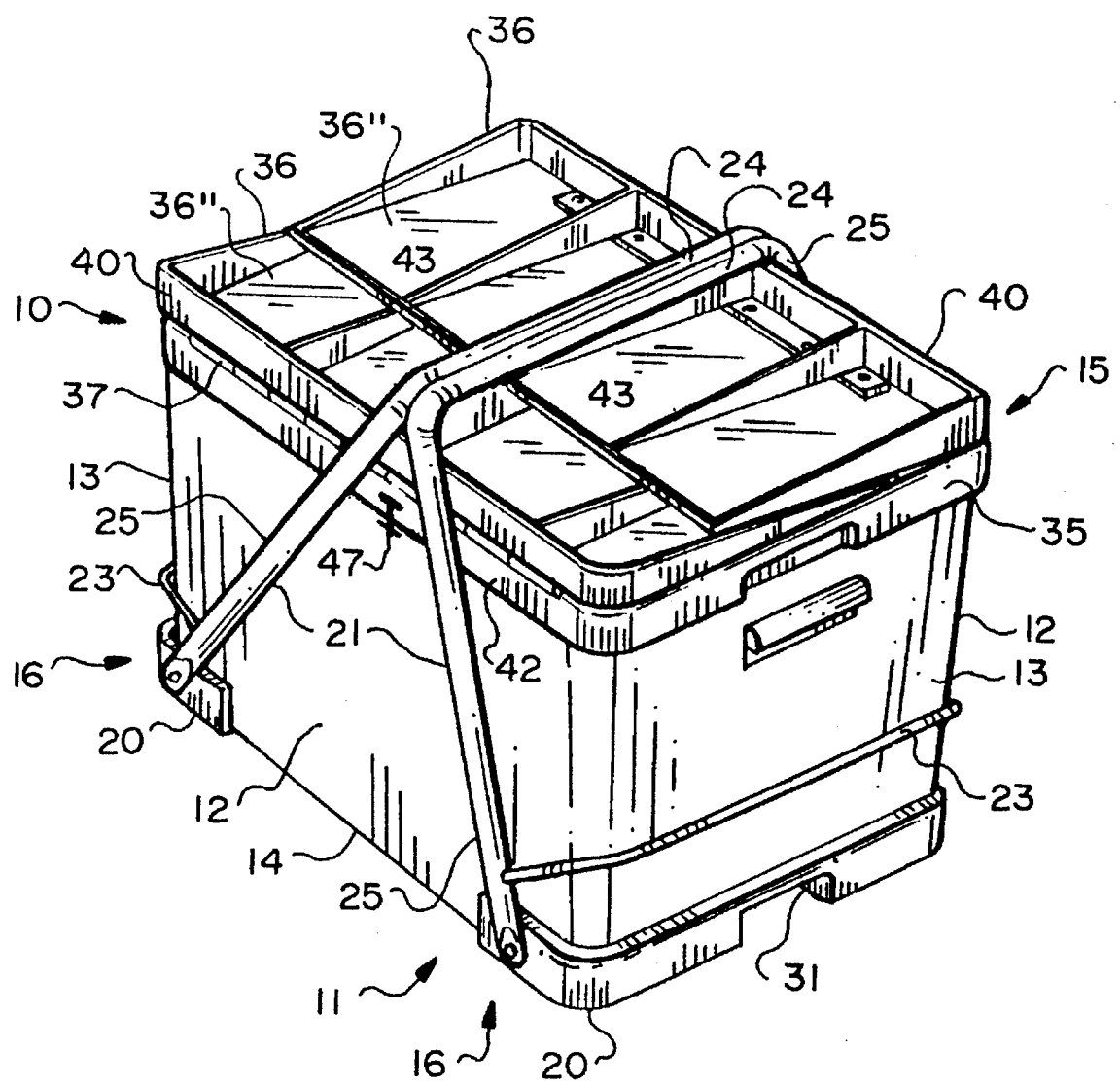
FIG. 1 is a perspective view of a portable container according to this invention in a first position.
Figure 2:
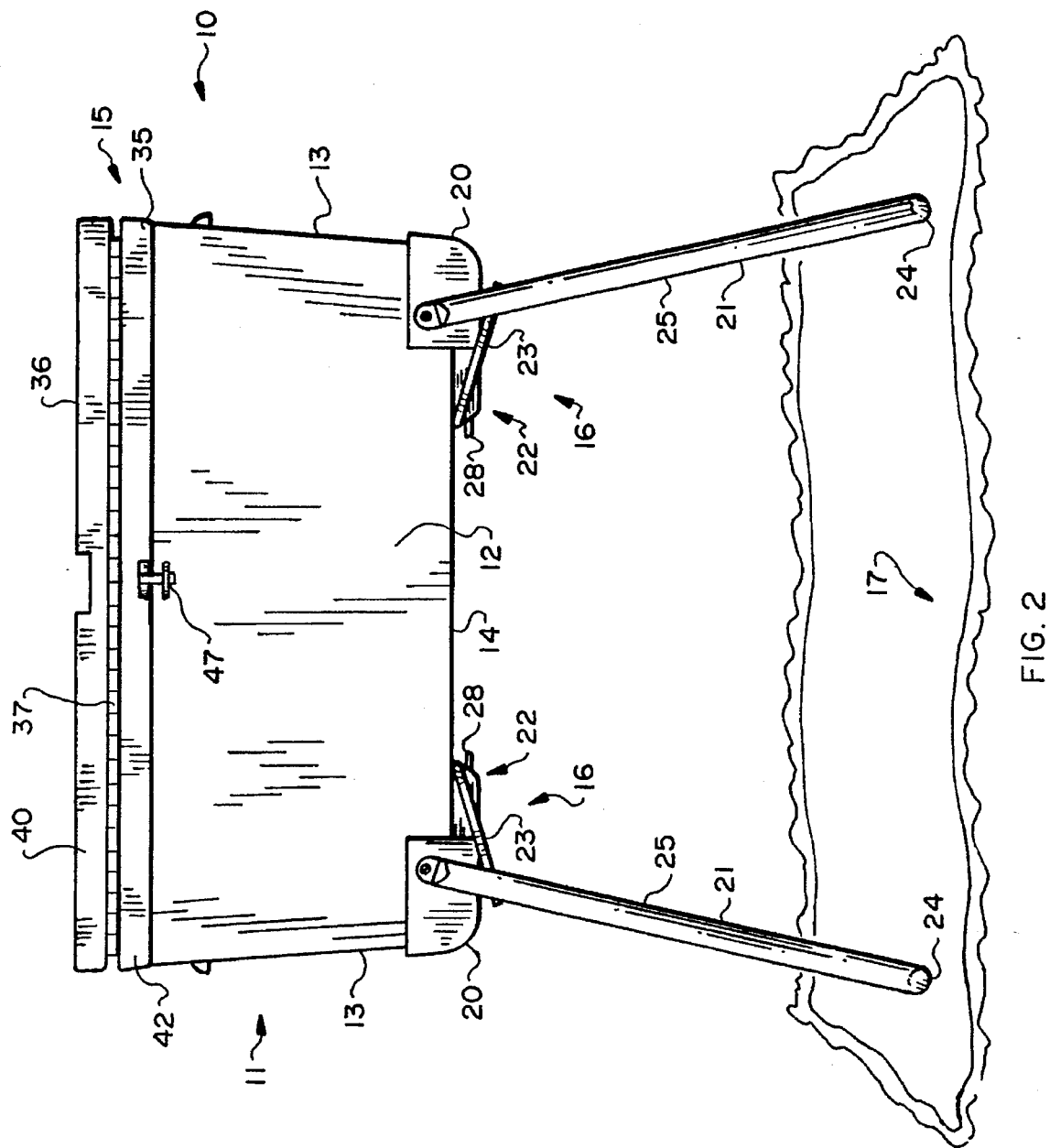
FIG. 2 is a plan view of the portable container of FIG. 1 in a second position.

Referring to FIGS. 1 and 2, a portable container 10 according to the present invention comprises a storage receptacle 11 defined by wall members, including sides 12 and ends 13, a bottom 14, and a movable cover member 15 positionable to overlay the wall members of the receptacle. The receptacle 11 thus defined comprises a substantially hexahedron structure with an internal storage area (not shown) therein. Movement of the cover member 15 from its position overlying the wall members 12 and 13 enables a user to access the internal storage area of the receptacle 11.

Leg means or leg structures 16 attach to the bottom 14 of the receptacle 11 to provide both a handle for carrying the receptacle 11 and legs for supporting the receptacle above a surface 17 such as the ground. Each of the leg structures 16 includes a base structure 20 secured to the bottom 14, U-shaped tubular members 21 extending from the base structure 20, a locking mechanism 22 associated with the base structure 20, and a C-shaped member 23 secured to the U-shaped member 21. The U-shaped members 21 pivot between a first, or carrying, position depicted in FIG. 1 and a second, or supporting, position depicted in FIG. 2.

Each of the U-shaped members 21 include a base member 24 defining the base of the U-shaped members 21 and extending legs 25 defining the arms of the U-shaped members 21. The legs 25 of each of the U-shaped members 21 are spaced from each other a distance greater than the width of the receptacle and extend a distance greater than the height of the receptacle to enable the pivoting of the U-shaped member 21 between the first and second positions. Thus as depicted in FIGS. 1 and 2, respectively, the base member 24 in the first position provides a gripping or grasping surface for supporting the receptacle 11 and in the second position provides the engagement surface for engaging the surface 17 above which the receptacle 11 is supported thereby.

Each C-shaped member 23 secures to and extends between the legs 25 at a distance spaced from the base member 24. Each C-shaped member 23 provides a brace member for the legs 25 and also provide limits for the travel of the U-shaped members 21. Specifically, the C-shaped members 23 of each of the leg structures 16 engage one of the ends 13 of the receptacle 11 as the U-shaped members 21 move to their first position to inhibit movement of the U-shaped members 21 beyond such position. Likewise, the C-shaped members 23 engage the bottom 14 to inhibit movement of the U-shaped members 21 beyond the second position.

Figure 3:
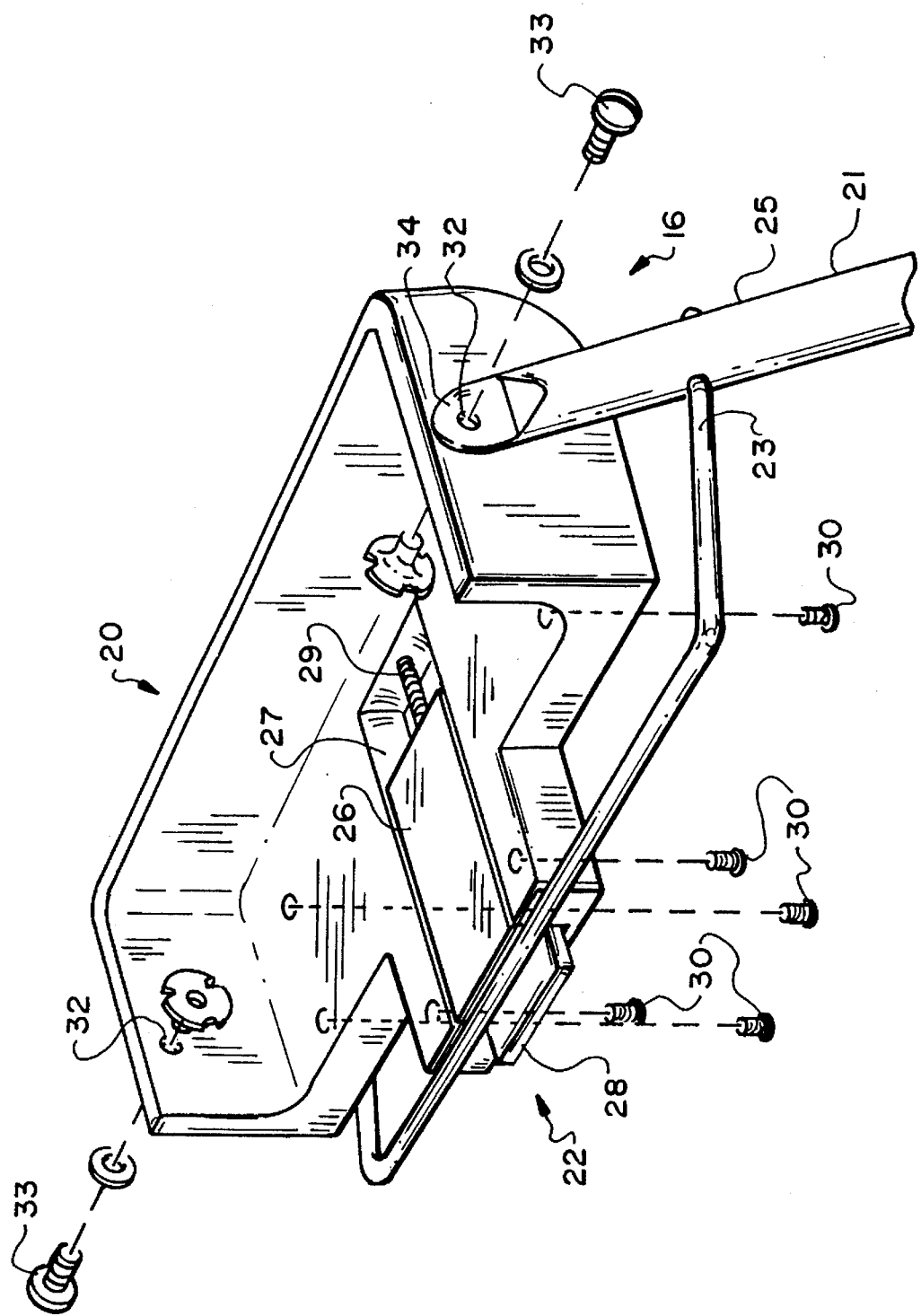
FIG. 3 is an enlarged exploded view of a portion of the portable container of FIG. 1.

The locking mechanism 22 locks the C-shaped member 23 proximate the bottom 14 with the U-shaped member 21 in the second position to thereby lock the U-shaped member 21 in that position. The locking mechanism 22, as depicted in FIG. 3, comprises a sliding member 26 that slides in a slot 27 and an extending tongue member 28 secured to the sliding member 26. The tongue member 28 in an extended position retains the C-shaped member 23 between the tongue member 28 and the bottom 14 to thereby lock the U-shaped member 21 in the second position. Retraction of the sliding member 28 frees the C-shaped member and enables the movement of the U-shaped member 21 between the first and second positions. As will be appreciated, a spring member 29 may be positioned between the end of the slot and the end of the sliding member 26 opposite the tongue member 28 to bias the sliding member 26 into the extended position.

Each of the base structures 20, as depicted in FIG. 3, includes an inner surface for abutting the receptacle with screws 30 or other suitable securing means, such as bonding, fusing, or welding, securing the base structure 20 to the receptacle 11. Additionally the base structure 20 may be formed so as to overlap portions of the walls of the receptacle and may be provided with a depressed gripping area or hand hold 31 (FIG. 1) to facilitate the lifting of the receptacle 11 thereat. Preferably the sliding member 26 includes a portion (not shown) extending into the opening defined by the hand hold 31 enabling a user to control the action of the sliding member 26. The base structure 20 further includes axially aligned apertures 32 which receive threaded ends of bolts 33. Each of the bolts 33 extend through an aperture 34 proximate the free end of the legs 25 to pivotally supports and secure one of the U-shaped members 21 to each of the base structures 20 for enabling the movement of the U-shaped members 21 between the first and second positions.

Figure 4:
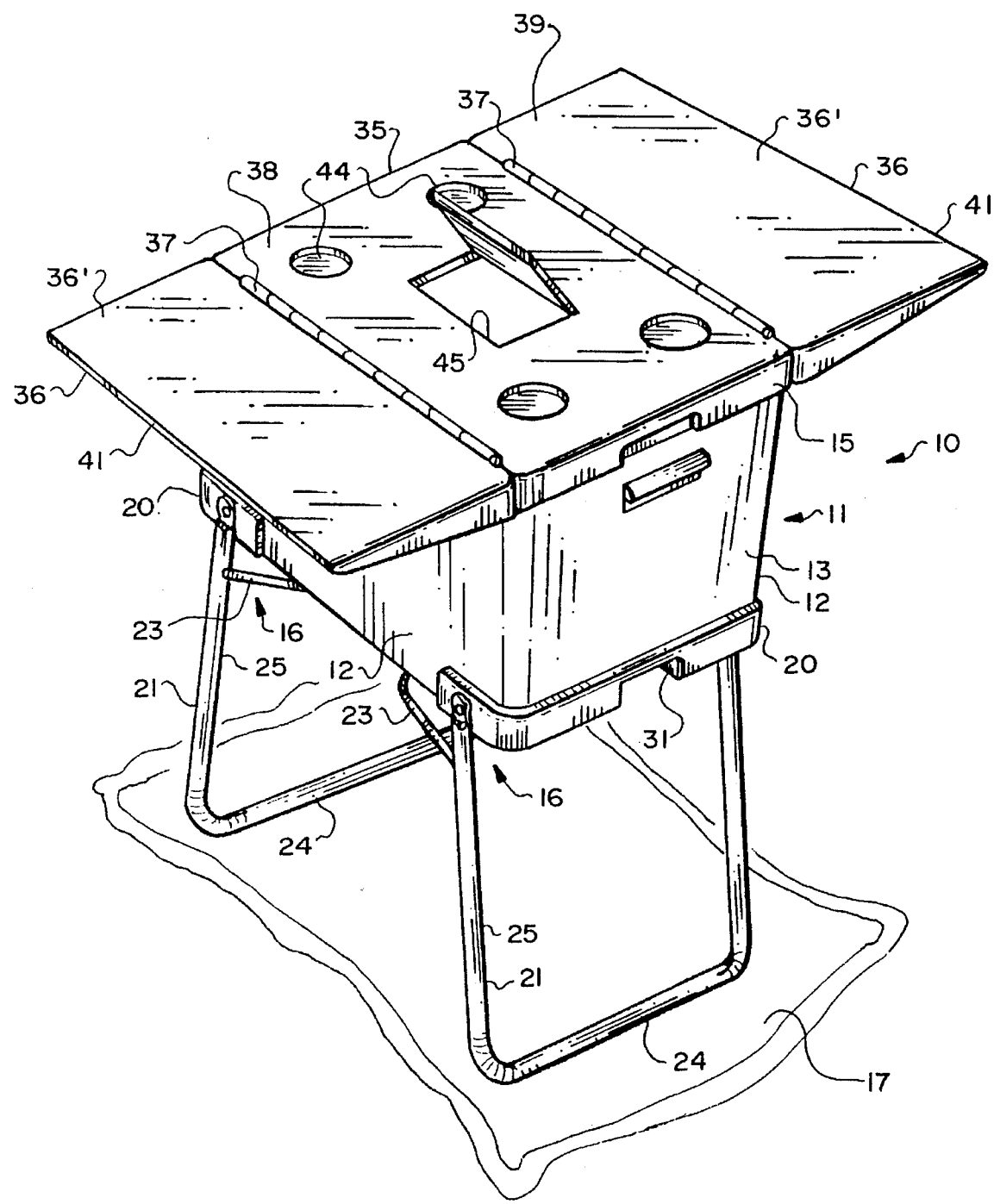
FIG. 4 is a perspective view of the portable container of FIG. 1 in a third position with extensions of a cover extending away from the container to define a table surface.

Referring to FIG. 2 and 4, each leg structure 16 with its U-shaped member 21 locked in the second position shown in FIG. 2 supports the receptacle 11 in a raised condition with the bottom 14 spaced from the surface 17, as described above. The cover member 15 in its position overlying the sides and ends 12 and 13 provides a raised surface. Specifically, the cover member 15 includes a central cover portion 35 overlying the sides and ends 12 and 13 and two leaves or extensions 36 pivotally secured to the central cover portion 35 by hinges 37. The extensions 36 when swung away from an upper planar surface 38 of the central cover portion 35 define a table surface 39 depicted in FIG. 4 and when swung proximate the upper surface 38 define the compact condition of the cover member 15 depicted in FIGS. 1 and 2.

With continuing reference to FIGS. 2 and 4, each of the leaves 36 tapers from a relatively wide edge 40 proximate the hinges 37 to a relatively narrow edge 41 opposite thereto. The wide edge 40 abuts an edge 42 of the central cover portion 35 when defining the table surface 39. The engagement of the edges 40 and 41 provides support to the associated ones of the leaves 36 when defining the table surface 39. The extensions 36 preferably comprise a substantially rigid and resilient molded polymeric material, such as polyethylene. One planar surface 36' forms the table surface 39 when the extension 36 is open. Another planar surface 36" lies on the opposite side of the planar surface 36' and is visible from the top of the cover member 15 when the extension 36 is closed. The extensions 36 additionally included integrally molded stiffening struts 43 that extend normally from the planar surface 36" thereby to provide additional rigidity to the table surface 39. Further, the tapered cross-sectional form of the extensions 36 allows each of the extensions 36, when folded over the central cover portion 35, to lie in a relatively compact form proximate the upper surface 38 and adjacent the other of the extensions 36.

The table surface 39 can be provided with integrally formed depressions, slots, apertures and other structures for receiving the bases of common devices, appliances, tools, food vessels (e.g. plates, utensils, glasses, beverage containers) and the like. For example, the upper surface 38 of the central cover portion 35 in FIG. 4 includes circular openings 44 that, in this instance, are particularly suited for receiving soft drink and other beverage retaining cans and glasses.

As another feature of this invention the upper surface 38 includes an aperture 45 and second cover 46 for overlying the aperture 45. This structure provides access through the table surface 39 to the inner storage area portion of the receptacle 11 without otherwise opening or removing the cover member 15.

Thus, to use the present invention a user removes the cover member 15 or pivots it to a vertical position and inserts desired items in the storage area including any desired thermal transfer material (e.g., freezer packs). The user then closes the cover member 15 with the extensions 36 overlying the central cover portion 35 and orients the U-shaped members 21 in the first position, shown in FIG. 1. In this configuration the user can easily grasp the base member 24 or the hand hold 31 in the base structure to transport the receptacle 11. Once the receptacle 11 is positioned proximate a desired location, the user can then move the U-shaped members 21 toward the second position depicted in FIG. 2 and lift the receptacle 11 by the hand holds 31. Lifting the receptacle 11 enables the leg structures 16 to assume the position shown in FIG. 2 and moving the sliding member 26 to the locking position locks the leg structures 16 in place so that the user can then lower the receptacle 11 to a supporting surface.

Once the U-shaped members 21 are positioned below the cover member 15, the extensions 36 can be folded away from the upper surface 38 of the central cover portion 35 to define the table surface 39. Thus, the table surface 39 can be provided as desired whenever the U-shaped members 21 are below the cover member 15. Deployment of the extensions 36 to form the table surface still enables access to the inner storage area of the receptacle 11. However, as those skilled in the art will appreciate the cover member 15 preferably attaches hingedly attaches along the central cover portion 35 to one side 12 and releasably latches to the other side 12 by a latch mechanism 47 (FIGS. 1 and 2). Thus, to further avoid disruption of the table surface once deployed, the user can access the inner compartment through the aperture 45 and cover 46 provided in the central cover portion 35.

After the need for the table is completed, the user merely folds the extensions 36 proximate the upper surface 38. Provided that the U-shaped members 21 have been locked in their second position, the user can then return the container 10 to the carrying mode by releasing the C-shaped members 23 by operation of the locking mechanism 22 and moving the U-shaped members 21 to their first position. This can be accomplished by lifting the receptacle 11 by the hand holds 31 and retracting the sliding members 26 pivoting the U-shaped members 21 toward their first position depicted in FIG. 1. This can be accomplished, for example, by merely lowering the receptacle 11, as the U-shaped members 21 will tend to pivot from the second position toward the first position in this case. The U-shaped members can then be moved to the first position to enable carrying the receptacle thereby.

The container 10 and portions thereof are formed of known materials suitable for their purposes. For example, the C-shaped member is preferably formed of aluminum, stainless steel, or spring steel. The U-shaped members 21 are preferably a hollow tube made of aluminum or stainless steel. The receptacle and the cover member are preferably formed of a relative strong polymer material that is a light weight such as polyethylene. The walls (i.e., the sides and ends 12 and 13), bottom 14, and central cover portion 35 which define the inner storage are also formed of a material which is relatively resistant to heat transfer. Applicant prefers that such parts be formed of double walled molded polyethylene for both strength and insulation.

Figure 5:
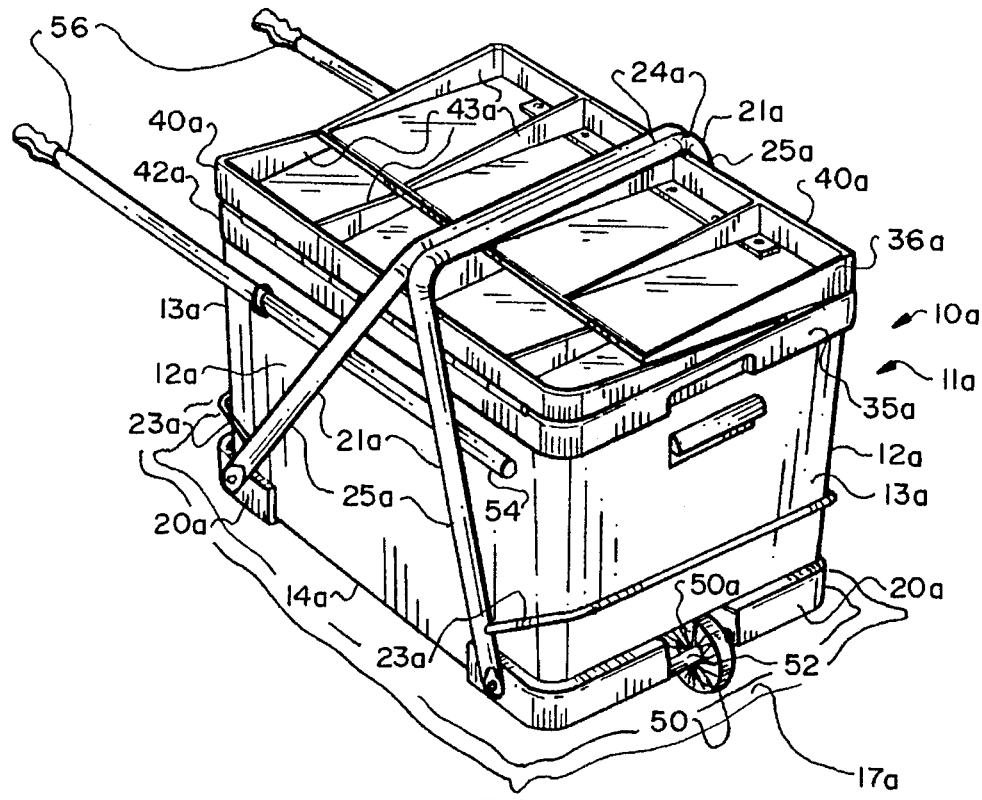
FIG. 5 is a perspective view similar to FIG. 1 of another embodiment of this invention.
Figure 6:
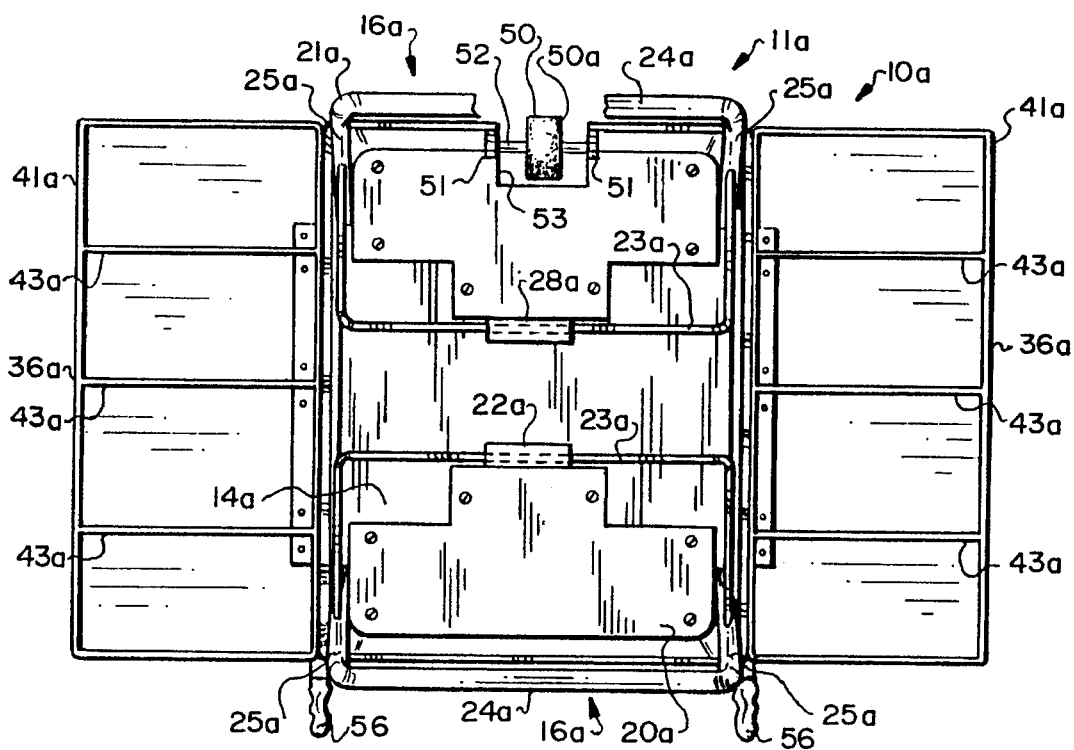
FIG. 6 is a bottom elevation of the portable container of FIG. 5 with extensions of a cover extending away from the container.

FIGS. 5 and 6 depict another embodiment of a container 10A according to this invention that includes a wheel 50 supported for rotation and adapted to engage a relatively planar surface such as ground 17A beneath the bottom of the receptacle. One of the walls 13A and a portion of the bottom 14A of receptacle 11A of the container 10A are formed with a slot or well 50A therein for receiving a portion of the wheel 50. The base structures 20A at the well 50A supports suitable mounting brackets 51 that support an axle 52 carrying the wheel 50. A portion of the wheel 50 extends through an aperture 53 in the base structure 20A that corresponds with the wheel well 50A for enabling free rotation of the wheel 50.

The container 10A additionally includes handles 56 supported by mounts 57 (only one of which is depicted) to each of the sides 12A. The handles 56 preferably retract into the mounts 57 from the extended position with the handles 56 extending away from the one of the ends 13A as depicted in FIG. 5 to position proximate the sides 12A and one of the ends 13A as depicted in FIG. 6. The handles 56, the mounts 57 or both preferably include known detent or other locking apparatus for selectively retaining the handles in a desired position. In the extended position, each of the handles 56 provide a handle that allows a user to lift the receptacle 11A about the axle 52. Lifting the receptacle 11A by the handles 56 transfers much of the weight associated with the receptacle 11A onto the wheel 50 and enables the user to transport the container 10A in a wheel-barrow like fashion. Thus, this embodiment of the container 10A facilitates transport of the receptacle 11A.

The U-shaped members 21A interact with base structures 20A for positioning the U-shaped members in first and second positions providing handles and legs, respectively for supporting the receptacle 11A much like that described with respect to the container 10 of FIG. 1. Likewise, the provision of the cover member 15A with central cover portion 35A and extensions 36A enable formation of a table surface as also described with respect to the container 10 of FIG. 1. It will be understood that the retraction of the handles 56 proximate the one end 13A enables the passage of the U-shaped members 21A between the first and second positions. Thus, this embodiment provides a relatively easily transported portable storage container that can be loaded with a substantial amount of items and thermal material in terms of weight and be transported by an individual. Additionally, the embodiment provides a portable container that also conveniently and easily converts into a table.

Figure 7:
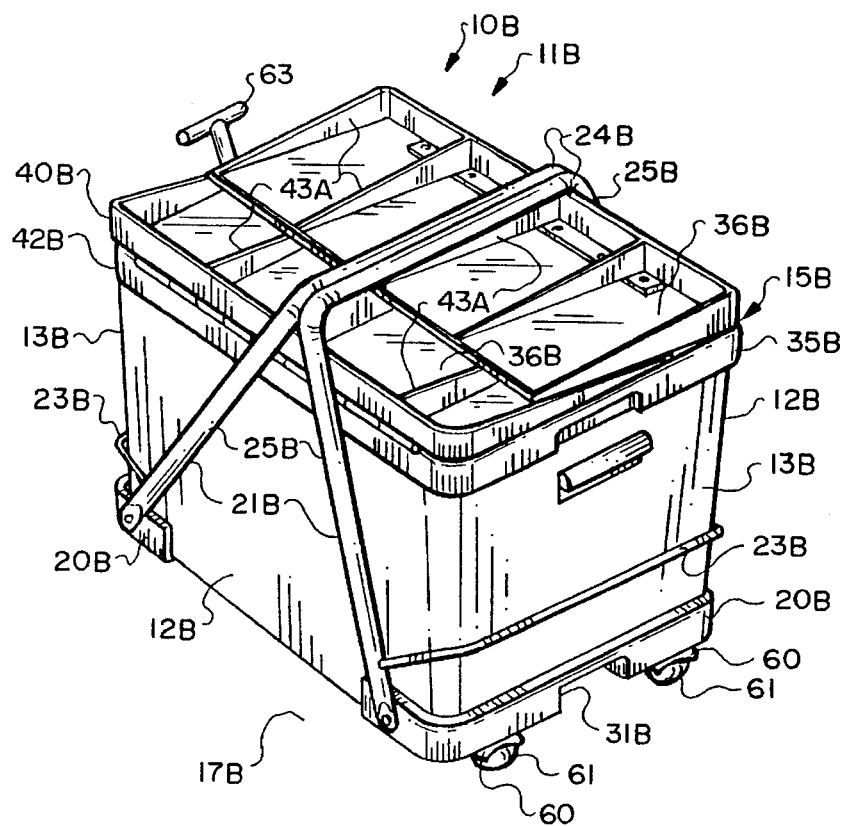
FIG. 7 is a perspective view similar to FIG. 1 of yet another embodiment of this invention.
Figure 8:
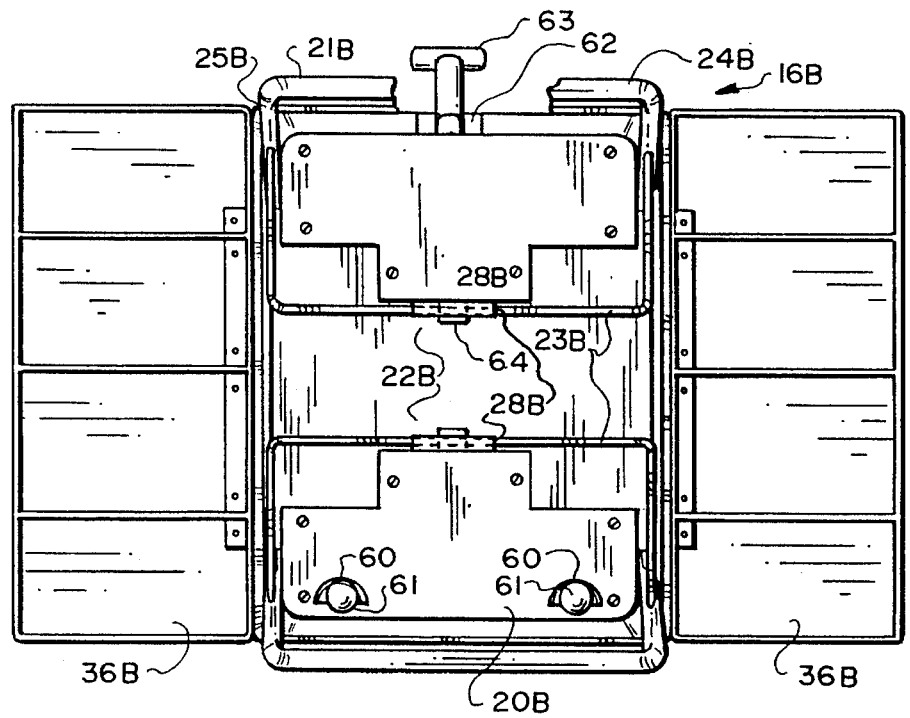
FIG. 8 is a bottom elevation of the portable container of FIG. 7 with extensions of a cover extending away from the container.

A container 10B in FIG. 7 and 8 includes substantially the same components of the containers 10 and 10A of FIGS. 1 and 5, respectively. However, one of the base structures 20B in this embodiment includes a pair of spaced mounts 60 for receiving and supporting suitable rotational supports, such as casters 61. A handle mount 62 secures to the base structure 20A opposite the base structure supporting the two mounts 60. The handle mount 62 preferably pivotal attaches to the base structure 20A enabling movement between a stowed position extending parallel to the end 13A to an operative position diverging extending away from the end 13A. If desired, the handle 63 can also be provides with a telescoping feature to enable a further extension of the handle 63 from the receptacle 11A. The handle 63 provides a convenient surface for a user to grasp and lift a portion of the receptacle 11B clear of the ground 17B. This action transfers much of the weight associated with the receptacle 11A onto the casters 61 to enable the user to pull the receptacle along a surface on the casters 61.

As with the other embodiments described above, the container 10B includes U-shaped members 21B that pivot between first and second positions to define carrying handles that extend above the cover member 15B and legs that extend below the bottom 14B to support the receptacle 11B thereabove. The base structures 20B also include locking devices for selectively engaging C-shaped members 23B to retain the U-shaped members 21B their second positions. A cover member 15B also provides the apparatus for forming an enlarged table surface extending over the open top defined by the walls of the receptacle 11B.

It will be understood that the base structure 20B supports the mounts 60 and the casters 61 sufficiently proximate the outer surface of the receptacles 11A and 11B to permit the U-shaped members 21B and the C-shaped members 23B attached thereto to move between the first and second positions without interference. Additionally, moving the handle 63 to its position extending proximally along the end 13A also enables the movement of the U-shaped members 21B between the first and second positions. However, the C-shaped member is preferably formed with an indented portion 64 to accommodate the handle 63. Those skilled in the art will also understand that various known mechanisms may be employed, if desired, with the containers 10A of FIG. 5 and 10B of FIG. 7 to provide a brake or other device for selectively inhibiting rotation of the wheel 50 and the casters 61, respectively.

Figure 9:
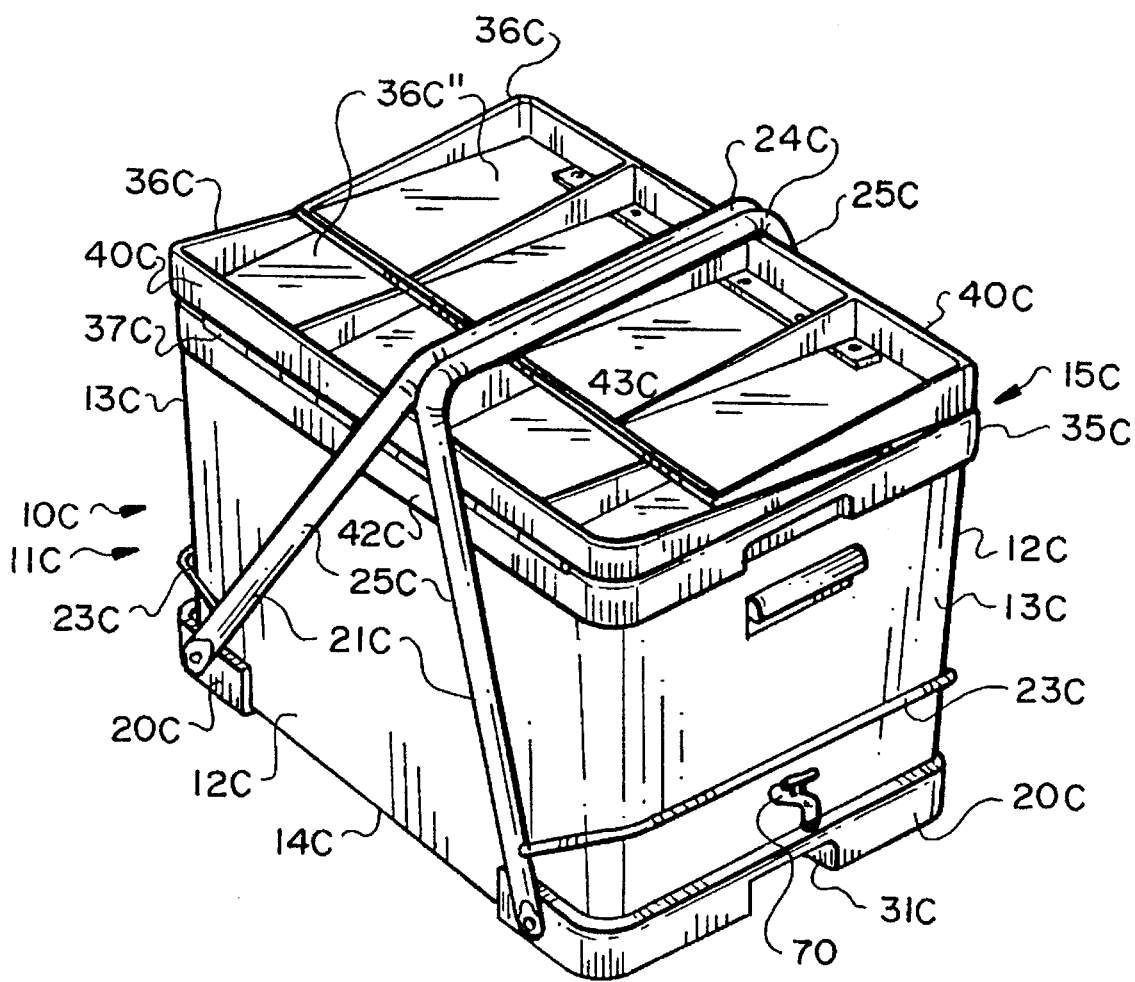
FIG. 9 is perspective view similar to FIG. 1 of still yet another embodiment of this invention.

Another embodiment of this invention depicted in FIG. 9 includes a known fluid dispenser device, such as a spigot 70, mounted in one of the ends 13C. The fluid dispenser enables users to selectively draw fluid, such as water generated by melting ice, from the inner compartment. Those skilled in the art will also appreciate that a fluid dispenser provided with any of the containers 10, 10A, 10B, or 10C of this invention enables use of the container to selectively dispense beverages, such as coffee, cocoa, lemonade and the like. Where the container 10C is primarily used as a beverage dispenser, the legs 25C of the U-shaped member 21C proximate the spigot 70 can be formed shorter than the legs 25C of the opposed U-shaped member 21C to enable more complete drainage through the spigot 70 of liquids in the inner compartment.

In summary, the foregoing has described and disclosed a portable storage container for maintaining items therein at a differential temperature relative to the ambient temperature. The container includes walls and a bottom defining an open top receptacle with a cover for overlying the open top. The container includes leg members for forming in a first position a carrying handle to promote the transport of the receptacle and in a second position for supporting the receptacle in a raised position above the ground. The features of this invention further include providing the cover with a central portion for overlying the open top and extensions pivotally secured to the central portion. Pivoting the extension relative to the central portion defines a table surface and a relatively compact cover with the extensions overlying the central portion adjacent one another. Additionally, this invention may include, either additionally or separately, handles extending beyond a first wall for grasping by a user and a wheel supported for rotation proximate a wall opposed to the first wall. The combined handle and wheel provides a means facilitating the transport of the container.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. In a portable container having a bottom portion and side portions defining a receptacle of a predetermined maximum width and height, the improvement of means for connection to the receptacle for acting as support legs and a carrying handle comprising first and second leg means for attachment to opposite edges of the receptacle, each of said first and second leg means comprising:

(A) base means for attachment to the bottom of the receptacle, (B) a U-shaped leg member having first and second leg portions extending from an interconnecting base to free ends thereof at a distance than is greater than the maximum height of the receptacle, said base spacing said first and second leg portions by a distance greater than the maximum width of the receptacle, (C) means for connecting each free end of a leg portion to said base means at spaced, coaxial pivot points whereby said U-shaped leg member can pivot between first and second positions, and (D) means interacting with said base and said first and second leg portions for locking said leg in the second position with said U-shaped leg member depending from the bottom portion whereby said U-shaped shaped leg members when locked in the second position support said receptacle thereover and when in the first position extend above said receptacle to define a carrying handle.

2. A portable container as recited in claim 1 wherein said base means comprises a cup-shaped member disposed over portions of the bottom and sides of the container.

3. A portable container as recited in claim 2 wherein said interactive means includes locking means secured to the base means for selectively locking said U-shaped member in the second position.

4. A portable container as recited in claim 3 wherein said interactive means further includes a C-shaped member extending between said leg portions of said U-shaped member between said free ends thereof and said base portion.

5. A portable container as recited in claim 4 wherein said locking means includes a sliding member having a tongue portion selectively moveable between a locking position and an open position whereupon, positioning said U-shaped member in the second position and moving said sliding member to the locking position, said tongue portion engages said C-shaped member intermediate said leg portions and retains said C-shaped member proximate said bottom whereby said U-shaped member is locked in the second position and thereafter moving said sliding member to the open position disengages said tongue portion from said C-shaped member enabling pivoting of said U-shaped member to the first position.

6. A portable container as recited in claim 3 further comprising a C-shaped member extending between said leg portions intermediate said free ends thereof and said base portion, said C-shaped member engaging a side of the receptacle upon positioning said U-shaped member in the first position to resist movement of said U-shaped member beyond the first position and engaging the bottom of the receptacle upon position said U-shaped member in the second position to resist pivotal movement of said U-shaped member beyond the second position.

7. A portable container as recited in claim 3 wherein said receptacle further includes a movable cover member having a first surface engaging and overlying the top edges of said sides of said receptacle for enclosing a storage area defined between said sides and said bottom and a second planar surface opposite said first surface for defining a raised table surface when said receptacle is supported by said U-shaped members in the second position.

8. A portable container as recited in claim 1 further comprising a C-shaped member extending between said leg portions intermediate said free ends thereof and said base portion, said C-shaped member engaging a side of the receptacle upon positioning said U-shaped member in the first position to resist movement of said U-shaped member beyond the first position and engaging the bottom of the receptacle upon position said U-shaped member in the second position to resist pivotal movement of said U-shaped member beyond the second position.

9. A portable container as recited in claim 1 further comprising a cover member having a first surface engaging and overlying the top edges of said sides of said receptacle and a second planar surface opposite said first surface for defining a raised table surface when said receptacle is supported by said U-shaped members in the second position.

10. A portable container as recited in claim 9 further comprising a rotationally mounted wheel carried by said bottom for rotationally engaging a surface and supporting said receptacle above the surface when said U-shaped members are in the first position to thereby facilitate transport of said container over the surface.

11. A portable container as recited in claim 1 further comprising a rotationally mounted wheel carried by said bottom for rotationally engaging a surface and supporting said receptacle above the surface when said U-shaped members are in the first position to thereby facilitate transport of said container over the surface.

12. A combination portable container for maintaining items within a temperature range and serving table comprising:

(A) an open-top receptacle for containing a medium that maintains the items in the required temperature range and for containing the items, (B) table means having a central portion for overlying the open top of said receptacle and extensions hinged thereon for forming a planar table surface comprising said central portion and said extensions an opened position;

(C) said central portion is hingedly secured to said receptacle whereby said central portion with said extensions in a closed position define a cover selectively moveable to access items in the receptacle; and (D) each of said extensions taper in cross-sectional thickness from an edge proximate the hinged attachment to said central portion to an opposed edge whereby said extensions in the closed position form a relatively compact structure overlying said central portion and said edge provides a relatively wide surface engaging an edge of said central portion in the open position.

13. A combination portable container as recited in claim 12 further comprising leg means, including bases, positionable in a supporting position for supporting said receptacle and said table means above a surface engaged by said bases.

14. A combination portable container as recited in claim 13 wherein said leg means are further positionable in another position to facilitate transport of said container.

15. A combination portable container as recited in claim 14 further comprising wheel carried by said receptacle for rotationally engaging a surface and supporting said receptacle above the surface when said leg members are in the other position to thereby facilitate transport of said container over the surface.

16. A combination portable container as recited in claim 12 wherein said central portion includes an aperture therein and a moveable cover overlying said aperture to enable access to items in said receptacle upon positioning said extensions in the open position.

17. A combination portable container as recited in claim 12 wherein said central portion includes slots adapted for positioning support surfaces of items placed upon said table surface.

18. A combination transportable container for maintaining items within a temperature range comprising:
(A) a receptacle for containing a medium that maintains the items in the required temperature range and for containing the items, said receptacle having first and second spaced opposite walls,
(B) a first support attached to said first wall,
(C) wheel means attached to said first support for rotation during movement of said container,
(D) a second support attached to said receptacle, and
(E) handle means attached to said second support and extensible beyond said second wall adapted for being grasped by an individual to lift a portion of said container thereby supporting said container on said wheel means whereby said wheel means and handle means facilitate the transport of the receptacle.

19. A combination portable container as recited in claim 18 wherein said receptacle further includes a bottom portion and third and fourth spaced opposite walls extending between said first and second walls to define an open top container with a portion of said wheel means extending below said bottom.

20. A combination portable container as recited in claim 19 wherein said second support comprises first and second mounts secured to said third and fourth walls, respectively, and said handle means comprises first and second members supported by said first and second mount, respectively, each of said first and second members being retractable from an elongated condition extending beyond said second wall to a retracted condition proximate said receptacle.

21. A combination portable container as recited in claim 20 wherein said wheel means includes a single wheel positioned with a portion extending beyond said bottom whereby said handles enabling lifting and pushing said receptacle on said wheel in a wheelbarrow-like fashion.

22. A combination portable container as recited in claim 19 wherein said second mount is secured to said second wall and said handle means includes an elongated, retractable member adapted for lifting said receptacle proximate said second wall and pulling said receptacle with the portion of said receptacle remote from said second wall being supported on said wheel means whereby transport of said container is facilitated.

23. A combination portable container as recited in claim 22 wherein said first support means includes first and second support members for supporting two wheels in a spaced relationship and said wheel means include a first and second spaced wheels supported by said first and second support members such that a portion of said first and second spaced wheels extend below said bottom.

24. A combination portable container as recited in claim 19 further comprising base members secured to said bottom proximate at opposed ends thereof proximate ones of said and U-shaped leg means including base portions positionable in a supporting position for supporting said receptacle above a surface engaged by said bases.

25. A combination portable container as recited in claim 24 further comprising interactive means for selectively securing said U-shaped leg means in said supporting position.

26. A combination portable container as recited in claim 25 further comprising cover means for overlying said open top of said receptacle said cover means having a central portion and extensions attached to said central portion and positionable in an open condition defining a enlarged table surface overlying said receptacle.

27. A combination portable container as recited in claim 19 further comprising cover means for overlying said open top of said receptacle said cover means having a central portion and extensions attached to said central portion and positionable in an open condition defining a enlarged table surface overlying said receptacle.

28. A combination portable container as recited in claim 27 wherein said central portion further includes an aperture with an associated cover for enabling access to items contained in said receptacle when said extensions are in said open condition.

29. A portable container for maintaining items within a temperature range comprising:
(A) an open top receptacle for containing a medium that maintains the items in the required temperature range and for containing the items, said receptacle having first and second spaced opposed wall members and a bottom,
(B) table means having a central portion for overlying the open top of said receptacle and extensions hinged thereon for forming a planar table surface comprising said central portion and said extension in an opened position,
(C) leg means, including first and second spaced U-shaped leg members, each of said U-shaped members having first and second leg portions extending from an interconnecting base to free ends thereof carried by said receptacle for pivotal movement between first and second positions and means for locking each of the U-shaped leg members in the second position, for defining a carrying handle with said U-shaped leg members in the first position and for providing support members for supporting said receptacle above a surface with said U-shaped members locked in the second position;
(D) wheel means, including at least one rotational member extending below said bottom, carried by said receptacle for rotationally supporting said container on a surface with said U-shaped leg members in the first position; and (E) handle means carried by said receptacle space from said wheel means and selectively extensible beyond said receptacle for being grasped by an individual to lift a portion of said container thereby supporting said container on said wheel means whereby said wheel means and handle means facilitate the transport of the receptacle.

30. A portable container as recited in claim 29 wherein said leg means further includes first and second base means attached to said bottom and said locking means includes a C-shaped bracing member extending between the leg portions of each of said U-shaped leg members and a slidable member supported in said base means for selectively retaining said C-shaped member between said slidable member and said bottom to thereby lock each of said U-shaped leg members in the second position.

* * * * *